United States Patent [19]

Murakami et al.

[11] 4,175,848
[45] Nov. 27, 1979

[54] PHOTOGRAPHIC INFORMATION DISPLAYING APPARATUS FOR A CAMERA

[75] Inventors: Hiroyashu Murakami, Tokyo; Tadashi Ito, Yokohama; Fumio Ito, Yokohama; Nobuaki Sakurada, Yokohama; Masaharu Kawamura, Hino; Nobuhiko Shinoda, Tokyo, all of Japan

[73] Assignee: Canon Kabushiki Kaisha, Tokyo, Japan

[21] Appl. No.: 911,912

[22] Filed: Jun. 2, 1978

Related U.S. Application Data

[63] Continuation of Ser. No. 675,236, Apr. 9, 1976, abandoned.

[30] Foreign Application Priority Data

Apr. 16, 1975 [JP] Japan ............................ 50-46011

[51] Int. Cl.² .................................................. G03B 17/20
[52] U.S. Cl. ................................................... 354/289
[58] Field of Search ............... 354/23 D, 53, 54, 60 E, 354/60 L, 289

[56] References Cited

U.S. PATENT DOCUMENTS 3,882,512  5/1975  Lawrence et al. ............ 354/23 D X
3,982,254  9/1976  Ito et al. ........................ 354/23 D X

FOREIGN PATENT DOCUMENTS 2529716  1/1976  Fed. Rep. of Germany ............. 354/53
2535329  2/1976  Fed. Rep. of Germany ........ 354/23 D Primary Examiner—Michael L. Gellner
Attorney, Agent, or Firm—Toren, McGeady and Stanger

[57] ABSTRACT

An apparatus for providing a digital display representative of photographic information which is visible in the viewfinder of a camera. Since the photographic information is comprised of a number of factors, a number of symbols or signs are displayed in association with the digital display so that the photographer can identify multidigit numbers displayed. The structure of the digital display is simplified by using an arrangement of connections between display and display driver which allows for further reduction in size of the camera.

4 Claims, 7 Drawing Figures

PHOTOGRAPHIC INFORMATION DISPLAYING APPARATUS FOR A CAMERA

This is a continuation of application Ser. No. 675,236, filed Apr. 9, 1976, now abandoned.

BACKGROUND OF THE INVENTION

1. Field of the Invention

This invention relates to display apparatus for displaying various exposure control parameters or exposure values in cameras or exposure meters, and more particularly to a digital display apparatus adapted for use with a digitally operated camera or exposure meter in which photographic information once stored in a digital circuit is displayed in the digital form at a location such as in the viewfinder thereof.

2. Description of the Prior Art

Recently, as electronics develops to ever-increasing extent, increasing proportions of photographic cameras are set to employ digitally operated exposure apparatus in association with digital display apparatus. Even in the case of cameras provided with analog exposure control apparatus, the employment of a digitally operated display apparatus for association with the analog exposure control apparatus is increased in proportion because of the derivation of many advantages in the camera management. The digital exposure control and digital display enable the use of a large-scale integrated circuit so that the apparatus may be compactly constructed even when the digital processing is relatively complicated as is usual in the digital circuit. This characteristic facilitates the incorporation of the apparatus in the housing of a camera or exposure meter, and also the improvement of control accuracy by several grades over that of the analog control. Therefore, the digitally operated exposure control apparatus and digital display apparatus are suitable for use in a superhigh grade camera. With such camera, it is desirable to display the photographic information in the viewfinder thereof and to arrange the digital display in association with indicia which enable the photographer to identify which multidigital number displayed is a factor or result, namely, an exposure control factor or a computed exposure value. This leads to the requirement that the digital readout element assembly of the display apparatus be positioned adjacent the viewfinder optical system of the camera. As the exposure control apparatus is separated and spaced apart from the display apparatus, it has been the prior art practice to provide a large number of signal transmitting channels through which the photographic information is transferred from the exposure control apparatus to the digital display apparatus, thereby giving disadvantages of prejudicing the small, compact and rugged construction of the digital processing system and of limiting the space available for installation of the exposure control apparatus and digital display apparatus in the housing of the camera.

An object of the present invention is to provide a display apparatus which has overcome the above-mentioned conventional drawbacks.

Another object is to simplify the structure of a display apparatus by utilizing one of eight segments of a digital readout element in displaying the symbol which enables the photographer to distinguish a multidigital number representative of the exposure control factor from that representative of the computed result.

Other objects and features of the present invention will become apparent from the following detailed description taken in conjunction with the accompanying drawings in which:

DESCRIPTION OF THE PREFERRED EMBODIMENTS

Figure 1:
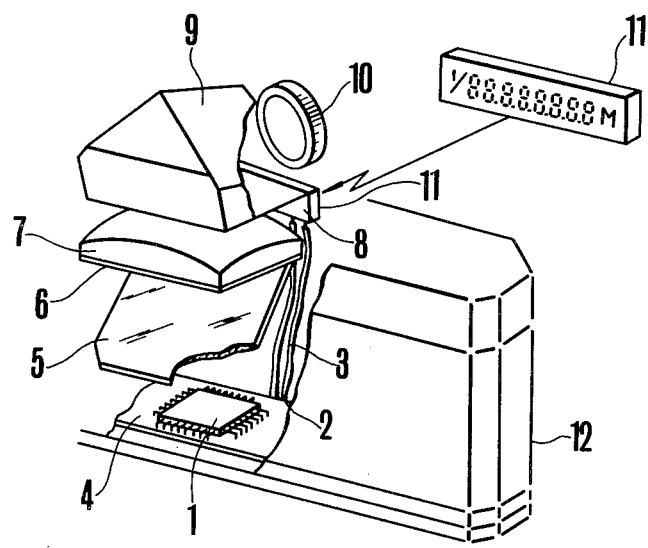
FIG. 1 is a fragmentary schematic perspective view, partly broken away, of an arrangement of a digital readout device in the vicinity of the viewfinder optical system of a single lens reflex camera according to the present invention.
Figures 2, 3, 4:
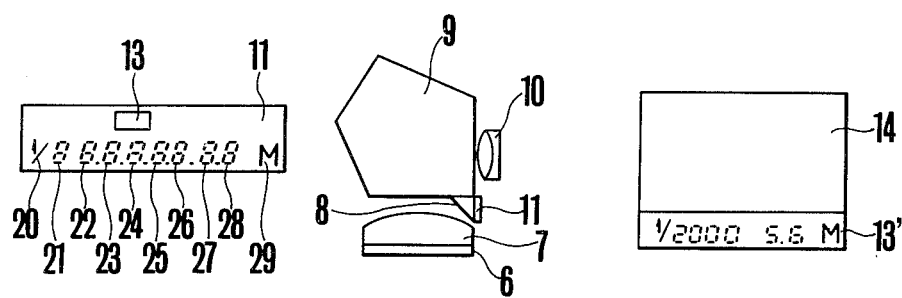
FIG. 2 is an enlarged elevational view of the readout device of FIG. 1.
FIG. 3 is a side sectional view of the basic components of the viewfinder optical system of FIG. 1 in connection with an arrangement of the readout device of FIG. 2.
FIG. 4 is a plane view of the image of indicia representing the photographic information in association with a symbol "M" as viewed by a photographer looking through the viewfinder of FIG. 3.

Referring to FIGS. 1 to 4, there is shown one embodiment of a digital display apparatus according to the present invention as applied to a single lens reflex camera having a housing 12. A reference numeral 1 denotes a first large scale integrated circuit (LSI) chip having formed therein part of the circuity of the digital display apparatus of the invention together with an exposure control circuit of the camera and provided with a number of terminals 2 connected to the chip 1 at one ends thereof, the opposite ends of which are connected to respective ends of the same number of insulated lead wires 3. A support plate for the LSI chip 1 is indicated at 4. The viewfinder optical system of the camera is shown as comprising a tiltable reflex mirror 5 in its viewing position, a focusing screen 6, a condenser lens 7, a pentaprism 9 and an eye-piece 10. Positioned adjacent the exit face of the pentaprism 9 and below the eye-piece 10 is a digital readout element assembly 11 with a supplementary prism 8, the parts 11 and 8 being arranged to permit the digital display at the lower vicinity 13' of the field of view of the finder 14 as shown in FIG. 4. This digital readout element assembly 11 has eight digit positions 21 through 28 in association with two symbols 20 and 29, namely, "1/" and "M", as shown in FIG. 2. The symbol "1/" when caused to appear indicates that the shutter speed is shorter than one second, and the other symbol "M" indicates that the camera is switched to the manual exposure control position. 13 is a second LSI chip mounted on the readout plate 11 and having formed therein part of the digital display control circuit. 14 is a finder mask.

Figure 5:
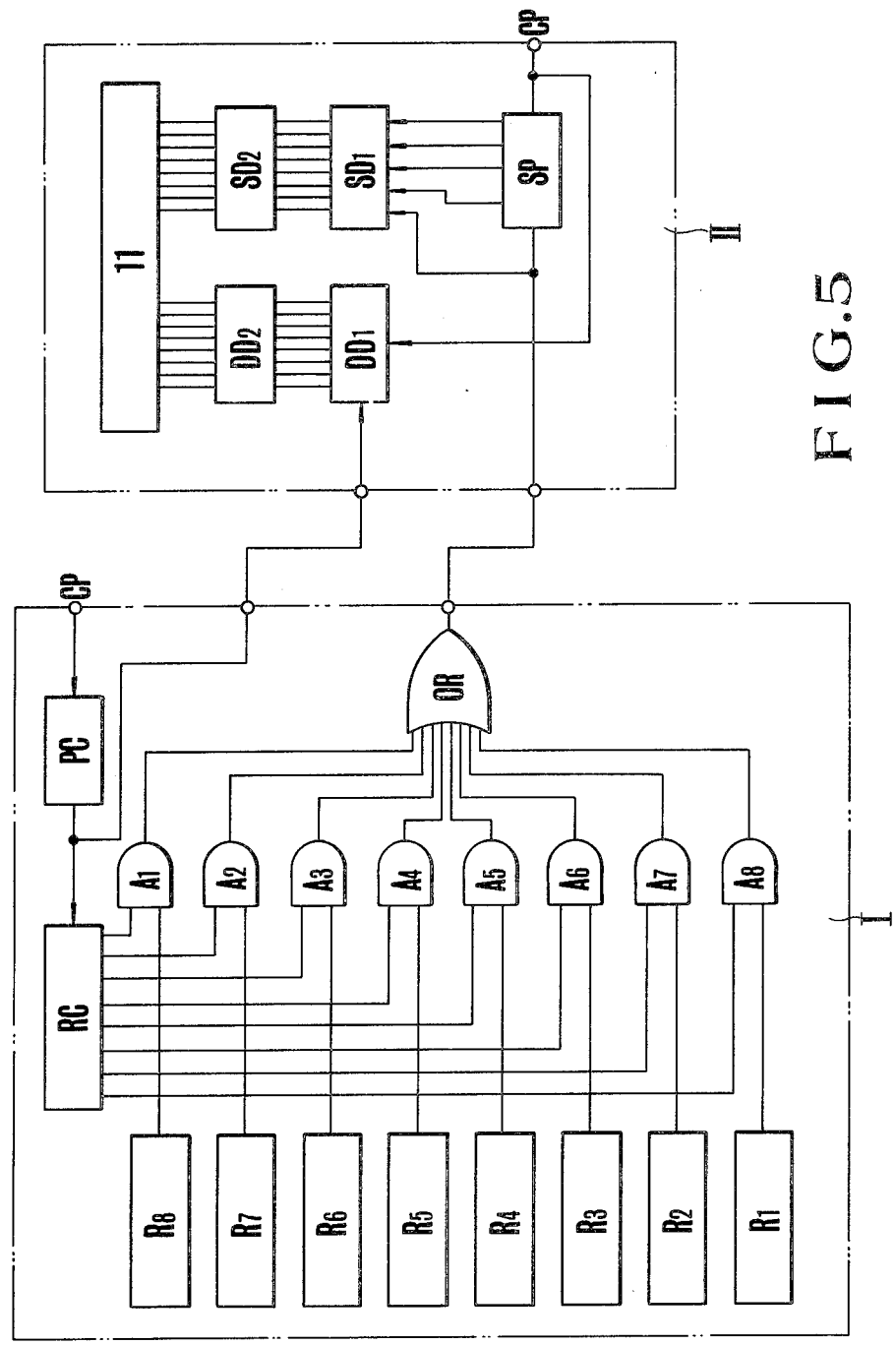
FIG. 5 is a schematic circuit diagram, partly in block form, of one embodiment of the digital display apparatus according to the present invention.

Referring to FIG. 5, there is shown an example of the circuitry of the digital display apparatus of FIGS. 1 to 4 as comprising a first circuit section enclosed by the dashed line I constituting part of the output stage of a not shown exposure control circuit and formed in the first LSI chip 1 of FIG. 1 and a second circuit section enclosed by the dashed line II constituting the digital readout element assembly 11 of FIGS. 1 and 3 and a control circuit therefor formed in the second LSI chip 13. The first circuit section I includes eight 5-bit shift registers R1 to R8 for storing the photographic information, in this instance, shutter speed and diaphragm value in the 5-bit binary-coded digital form, a scale-of-8 ring counter RC serving as a timing pulse generator and having eight output stages connected to respective AND gates A1 to A8 at their gating control input terminals, the other input terminals of which are connected to the respective registers R1 to R8, a scale-of-5 ripple counter PC connected between the ring counter RC and a clock pulse input terminal CP, and a single OR gate connected to all the output terminals of the AND gates A1 to A8. With this arrangement, the outputs of the registers R1 to R8 are sequentially transferred through the AND gates A1 to A8 and the OR gate OR and through a common signal-transmitting channel to the second circuit section II, while the sequence being controlled by the outputs of the ring counter RC. The second circuit section II includes a 4-bit shift register SP respective of the sequential signals supplied from the circuit I and receptive to the clock pulses supplied from the input CP for producing parallel outputs, a segment decoder SD1 for converting the content of each of the 5-bit registers to a control signal for the display of one of ten digits with a decimal point or with one of the two symbol in 8 segments, a segment driver SD2 connected between the segment decoder SD1 and the readout element assembly 20 to 29 of the display board 11, a digit decoder DD1 receptive of the signals supplied from the scale-of-5 ripple counter PC and from the scale-of-8 ring counter RC for producing place shift signals, and a digit driver DD2 responsive to the outputs from DD1 for controlling operation of each of the readout elements 20 to 29.

Figure 7:
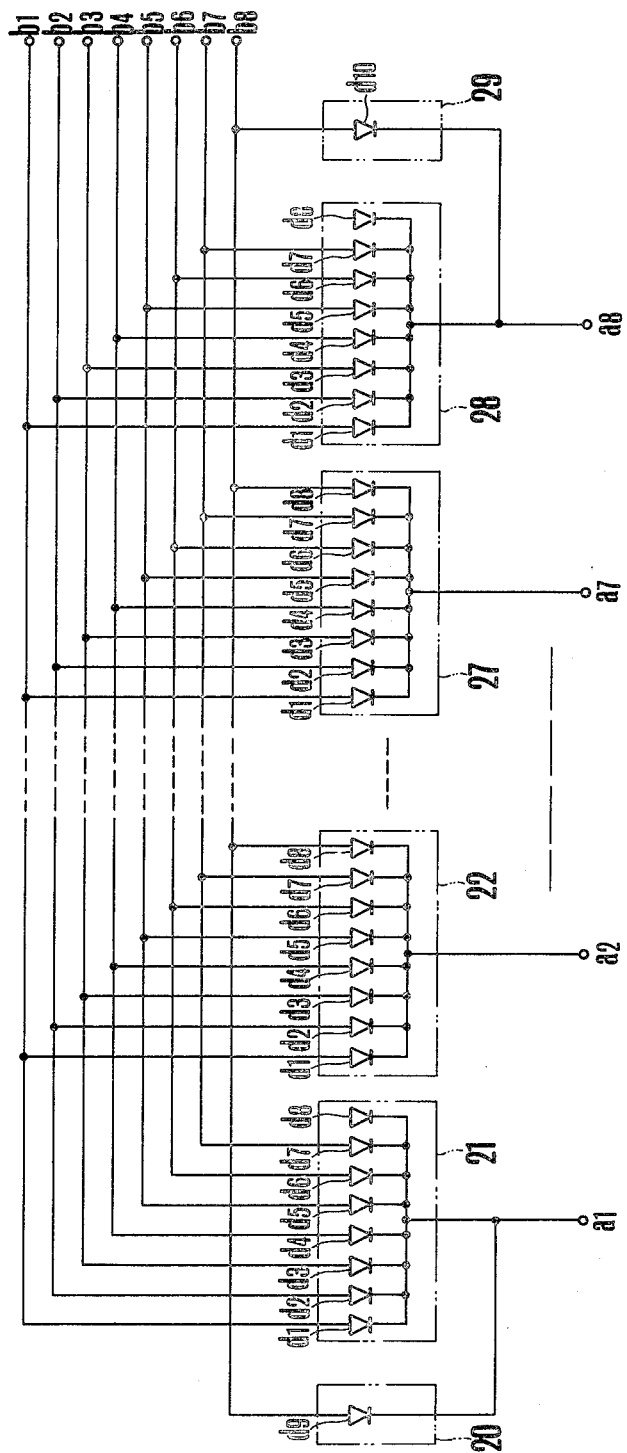
FIG. 7 is a fragmentary schematic circuit diagram of a digital readout element assembly usuable in the apparatus of FIG. 5.

FIG. 7 shows a specific example of the circuit of the readout elements 20 to 29. Of these, the readout elements 21 to 28 each are comprised of eight segments, in this instance, eight light-emitting diodes d1 to d8 connected in parallel with each other, with the cathods being connected to a common lead to which a place control signal a1, a2, . . ., a8 is applied from the digit driver DD2, and with the anodes connected to respective leads to which indicium control signals b1, b2, . . . , b8 are applied from the segment driver SD2, except that the anodes of the segments d8 of the first and eighth readout elements 21 and 28 are connected to no lead. Instead, there are provided two additional light-emitting diodes d9 and d10 serving as the readout elements 20 and 29, having anodes to which the indicium control signal b8 is applied, and having cathods to which the place control signals a1 and a8 are respectively applied. It is to be noted that the segment d8 of each of the readout elements 21 to 28 is adapted to display a decimal point.

The operation of the circuit of FIG. 5 is as follows. A camera control system not shown applied digital-coded signals such as binary dcoded signals representative of the photographic information to the shift registers R1 to R8. Each of these signals is representative of any one of the ten digits 0 to 9 with or without a decimal point, or a symbol "1/" or "M" as shown in the following table.

| Binary code | Register display R2–R7 | R 1 | R 8 |
|---|---|---|---|
| 0 0 0 0 0 | 0 | 0 | 0 |
| 0 0 0 0 1 | 1 | 1 | 1 |
| 0 0 0 1 0 | 2 | 2 | 2 |
| 0 0 0 1 1 | 3 | 3 | 3 |
| 0 0 1 0 0 | 4 | 4 | 4 |
| 0 0 1 0 1 | 5 | 5 | 5 |
| 0 0 1 1 0 | 6 | 6 | 6 |
| 0 0 1 1 1 | 7 | 7 | 7 |
| 0 1 0 0 0 | 8 | 8 | 8 |
| 0 1 0 0 1 | 9 | 9 | 9 |
| 0 1 0 1 0 | | | |
| 0 1 0 1 1 | | | |
| 0 1 1 0 0 | | | |
| 0 1 1 0 1 | | | |
| 0 1 1 1 0 | | | |
| 0 1 1 1 1 | | | |
| 1 0 0 0 0 | 0. | 1/ 0. | 0 M |
| 1 0 0 0 1 | 1. | 1/ 1. | 1 M |
| 1 0 0 1 0 | 2. | 1/ 2. | 2 M |
| 1 0 0 1 1 | 3. | 1/ 3. | 3 M |
| 1 0 1 0 0 | 4. | 1/ 4. | 4 M |
| 1 0 1 0 1 | 5. | 1/ 5. | 5 M |
| 1 0 1 1 0 | 6. | 1/ 6. | 6 M |
| 1 0 1 1 1 | 7. | 1/ 7. | 7 M |
| 1 1 0 0 0 | 8. | 1/ 8. | 8 M |
| 1 1 0 0 1 | 9. | 1/ 9. | 9 M |
| 1 1 0 1 0 | | | |
| 1 1 0 1 1 | | | |
| 1 1 1 0 0 | | | |
| 1 1 1 0 1 | | | |
| 1 1 1 1 0 | | | |
| 1 1 1 1 1 | blank | blank | blank |

As is understandable from this table, those of the binary coded signals which have "0" at the first bit position represent digit numbers not more than 9, and those which have "1" at the first bit position are associated each with a decimal point for registers R2 to R7, with a symbol "1/" for the first display position R1, and with a symbol "M" for the 8th display position R8. As shown in FIG. 4, the shutter speed display position is placed one order to the left from the diaphragm value display position. Therefore, the decimal points of the 1st and 8th positions are of no use, while a single decimal point is usually necessary for the diaphragm value display.

Therefore, a combination of symbol "1/" and any one of the ten digits 0 to 9 is displayed in the first position, depending upon the binary coded signal stored in the first register R1, while a combination of symbol "M" and any one of the ten digits 0 to 9 is displayed in the 8th position, depending upon the binary coded signal stored in the 8th register R8. Further, a combination of a decimal point and any one of the ten digits 0 to 9 is displayed in any one of the other display positions, depending upon the binary coded signal stored in the corresponding registers R2 to R7.

Figure 6:
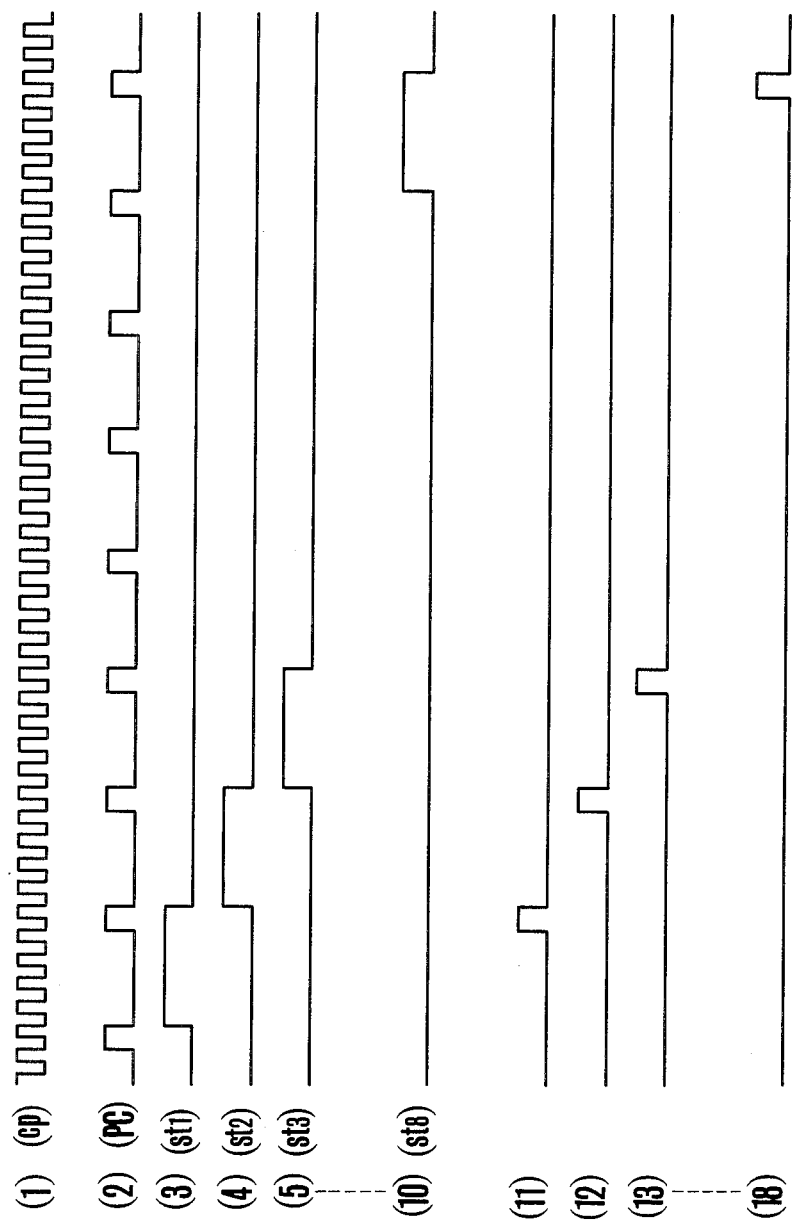
FIG. 6 is a pulse timing chart illustrating an example of the manner in which the apparatus of FIG. 5 may be operated.

With reference to FIG. 6, responsive to the clock pulse train on line (1) from the clock pulse input terminal CP, the scale-of-5 ripple counter PC produces a pulse train at a pulse repitition range 1/5 times that of the clock pulse train as shown on line (2) which is then applied to the scale-of-8 ring counter RC. The lagging edge of the first of every five clock pulses coincides with that of the output pulse of the ripple counter PC. The ring counter RC produces strove pulses St1 through St8 in sequence and in synchronism at the leading edges thereof with the lagging edges of the pulses of the ripple counter PC, as shown on lines (3) to (10) respectively. Assuming that the 8th register R8 registers a binary code [00110] representative of a digit number 6, a binary coded signal is derived from the register R8 in a time interval during which five clock pulses occur and is transferred through the first AND gate A1 the OR gate OR to the shift register SP, as the AND gate A1 is gated on by the first strove pulse St1on line (3). Next, the second AND gate A2 is gated on by the strove pulse St2 to read the binary code [10101] representative of a digit number 5 with a decimal point out of the register R7. Such a procedure is repeated each time the ripple counter RC produces a pulses to shift the output stage at which the strove pulse appears in sequence from the stage St1 to the stage St8 therethrough. These strove pulses are put to gate on the AND gates A1 to A8 in sequence so that the photographic information in the binary coded decimal form stored in the registers R8 to R1 is read out in one cycle of operation of the ring counter RC. These binary coded decimal signals are transmitted in sequence through the OR gate and a common channel from the first circuit section I to the second one II. In the second circuit section II, the coming signal is applied to the 4-bit shift register SP. While the five components of each binary coded decimal signal, for example, "0", "0", "1", "1" and "0" of the signal coming from the register R8 are applied to the segment decoder SD1 in sequence as synchronized with the occurrence of each clock pulse. In synchronism with the application of the 5th component, namely, "0", the digit decoder DD1 produces a pulse on line (11) of FIG. 6, thereby the least significant digit of the diaphragm value is displayed through the segment driver SD2 by the rightmost digit readout element 28. In this case, the symbol "M" is not displayed. If the binary code stored in the register R8 is [10110], it is displayed by the readout element 29. The binary coded data in the registers R1 to R8 are displayed serially from least significant digit to most significant digit as the pulses on lines (11) to (18) are produced from the digit decoder 1 serially. Assuming that the content of the last register R1 is [10010], a combination of a symbol "1/" and a digit number "2" is displayed by the readout elements 20 and 21 respectively.

The present invention has been described in connection with the specific example in which each of the eight digit readout elements is comprised of seven segments arranged to display any one of the ten digits 0 to 9 and of one additional segment arranged to display a decimal point, and further in which the rightmost and leftmost digit readout elements are associated with the symbol readout elements of which the display operations are controlled by the ones of the components of the binary coded decimal signals which would be otherwise utilized to display the decimal points of the rightmost and leftmost digit readout elements. Instead of using such an 8-segment type digit readout element at the rightmost display position, it is possible to use a 7-segment type digit readout element provided that the control signal which is normally discused for the operation of this readout element is utilized in controlling the operation of the symbol readout elements. Further, the above-described embodiment of the invention is illustrated as applied to a single lens reflex camera. But it is to be noted that the principles of the invention are applicable to any type of independent exposure meter which is digitally operated to derive an exposure value and also to external display apparatus adapted for attachment to the camera body from the outside thereof.

As shown above, in the display apparatus of the invention, a plurality of digitally coded signals constituting photographic information are transmitted through a common channel in sequence from the exposure control circuit formed in a first LSI chip to the display control circuit formed in a second LSI chip, thereby giving an advantage of minimizing the space in which the apparatus are mounted. Another advantage is to increase the flexibility of the arrangement of these apparatus within the housing of a camera or meter, which permits the full use of the space available therein. For the purpose of controlling operation of the symbol readout element, for example, for "1/" or "M", there is no need to provide an additional independent control signal, but to utilize the one of the components of the digit display control signal, thus assisting in the small, compact and rugged construction of the digital apparatus. These advantage and features of the invention are important for economic production of high-quality compact cameras having digitally operated exposure control apparatus.

What is claimed is:

1. A photographic information displaying apparatus for a camera comprising:
   (a) a first register with a plurality of digit positions for storing photographic information in digital form;
   (b) timing pulse generating means;
   (c) a gate means for successively providing the data stored in the first register in response to the timing pulse from the timing pulse generating means;
   (d) a second register for receiving the outputs of said gate means in sequence;
   (e) decoding means for decoding the content of said second register;
   (f) first display means for displaying outputs of said decoding means, said first display means having a plurality of display elements each composed of a plurality of segments, at least one of said plurality of display elements having at least one segment which is not used normally at the time of displaying, said non-used segment being disconnected from the decoding means; and
   (g) second display means for displaying predetermined indicia, said second display means having a segment to be connected to the decoding means, which segment operates to provide indication in response to a signal from the decoding means for controlling the non-used segment.

2. An apparatus according to claim 1, wherein said display element is composed of seven segments arranged to display one of ten digits and of one segment arranged to display a decimal point.

3. An apparatus according to claim 2, wherein the non-used segment is the segment for displaying a decimal point.

4. A photographic information displaying apparatus for a camera comprising:
   (a) a first register with a plurality of digit positions for storing information in digital form;
   (b) timing pulse generating means;
   (c) a gate means for successively providing the data stored in the first register in response to the timing pulse from the timing pulse generating means;
   (d) decoding means for decoding the outputs of said gate means, said decoding means having a plurality of output terminals;
   (e) means for forming a digit signal corresponding to the timing pulse from said timing pulse generating means, said means having a plurality of output terminals;

(f) first display means for displaying outputs of said decoding means, said first display means having a plurality of display elements each composed of a plurality of segments, at least one of said plurality of display elements having at least one segment which is not normally used at the time of displaying, each of segments other than said non-used segment being connected between one of the plurality output terminals of the decoding means and one of the plurality of output terminals of the digit signal forming means according to combination of said output terminals, when said non-used segment is not connected between said output terminals; and (g) second display means for displaying predetermined indicia, said second display means having a segment which is connected between one of the output terminals of the decoding means to be connected with the non-used segment and one of the output terminals of the digit signal forming means.

* * * * *